US008992097B2

United States Patent
Koreeda et al.

(10) Patent No.: US 8,992,097 B2
(45) Date of Patent: Mar. 31, 2015

(54) OPTICAL CONNECTOR

(71) Applicant: Japan Aviation Electronics Industry, Limited, Tokyo (JP)

(72) Inventors: Yuichi Koreeda, Tokyo (JP); Naoki Katagiyama, Tokyo (JP); Kohji Nakagawa, Tokyo (JP); Rika Nomura, Tokyo (JP)

(73) Assignee: Japan Aviation Electronics Industry, Limited, Tokyo (JP)

( * ) Notice: Subject to any disclaimer, the term of this patent is extended or adjusted under 35 U.S.C. 154(b) by 0 days.

(21) Appl. No.: 14/134,178

(22) Filed: Dec. 19, 2013

(65) Prior Publication Data

US 2014/0241671 A1 Aug. 28, 2014

(30) Foreign Application Priority Data

Feb. 25, 2013 (JP) ................................. 2013-034723

(51) Int. Cl.
*G02B 6/36* (2006.01)
*G02B 6/38* (2006.01)

(52) U.S. Cl.
CPC ..................................... *G02B 6/381* (2013.01)
USPC .............................................. 385/78; 385/81

(58) Field of Classification Search
CPC .... G02B 6/381; G02B 6/3887; G02B 6/3885; G02B 6/3825; G02B 6/3873; G02B 6/3893; G02B 6/3879
USPC ................................................. 385/77–84, 87
See application file for complete search history.

(56) References Cited

U.S. PATENT DOCUMENTS

| 5,689,598 | A | 11/1997 | Dean, Jr. et al. | |
|---|---|---|---|---|
| 6,227,719 | B1 * | 5/2001 | Aoki et al. | 385/59 |
| 6,454,464 | B1 * | 9/2002 | Nolan | 385/60 |
| 2002/0181883 | A1 * | 12/2002 | Harris et al. | 385/53 |
| 2005/0271328 | A1 * | 12/2005 | Ohtsu et al. | 385/59 |

FOREIGN PATENT DOCUMENTS

| JP | H10-104467 | 4/1998 |
|---|---|---|
| JP | H11-038278 | 2/1999 |
| JP | 2007-102013 | 4/2007 |
| JP | 2008-026647 | 2/2008 |

OTHER PUBLICATIONS

Japan Office Action, dated Oct. 1, 2013 along with an English translation thereof.

* cited by examiner

*Primary Examiner* — Ellen Kim
(74) *Attorney, Agent, or Firm* — Greenblum & Bernstein, P.L.C.

(57) ABSTRACT

There is provided an optical connector configured to receive a plurality of MT ferrules attached to terminal ends of multi-fiber cables. The optical connector includes a housing through which multiple receiving holes receiving the MT ferrules are bored. The receiving holes are arranged in the direction of the long side of front end faces of the MT ferrules. A pair of holding elements is provided in each of the receiving holes. The pair of holding elements is positioned at both ends in the direction in which the receiving holes are arranged and protrude to a side at which the MT ferrules are inserted. Both ends of a rear end flange of each of the MT ferrules placed in the receiving holes are held by the pair of holding elements. The optical connector enables easy setting-in of MT ferrules and reduction in size of optical connectors can be achieved.

23 Claims, 9 Drawing Sheets

OPTICAL CONNECTOR

TECHNICAL FIELD

The present invention relates to an optical connector having a structure receiving a plurality of MT ferrules attached to terminal ends of multi-fiber cables.

BACKGROUND ART

MT (Mechanically Transferable) ferrules are widely used for collectively connecting multi-fiber cables. Japanese Patent Application Laid Open No. 2008-026647 (published on Feb. 7, 2008, hereinafter referred to as Literature 1) describes a configuration in which an MT ferrule attached to a terminal end of a multi-fiber cable is connected to an MPO (Multi-fiber Push On) optical connector plug incorporating an MT ferrule at its front end through an optical receptacle housing.

FIG. 1 illustrates an MT ferrule and an optical receptacle housing described in Literature 1. An MPO optical connector plug is omitted from FIG. 1. FIG. 2 illustrates a configuration of the optical receptacle housing. Shown in FIG. 1 are the MT ferrule 11, a multi-fiber cable 12, an optical module 13, and a guide pin 14 inserted in the MT ferrule 11. FIG. 1 illustrates the MT ferrule 11 before being housed in the optical receptacle housing 20.

The optical receptacle housing 20 is a combination of a ferrule receiving part 21 receiving the MT ferrule 11 and a plug receiving part 22 in which an MPO optical connector plug is inserted and connected. The ferrule receiving part 21 includes a cylindrical ferrule receiving main body 24 defining a ferrule receiving hole 23 and a flange 25.

A pair of hooks 26 extending toward the optical module 13 is provided in the upper and lower walls of the ferrule receiving main body 24 so that the MT ferrule 11 inserted in and set in the ferrule receiving part 21 is latched and held by the hooks 26.

FIG. 3 illustrates a structure interconnecting a backplane (backboard) on which optical fibers are installed and a board (daughter board) that is described in Japanese Patent Application Laid Open No. 2007-102013 (issued on Apr. 19, 2007, hereinafter referred to as Literature 2).

A plurality of optical fibers 32 are arranged into a sheet-like structure and affixed to the backplane 31. An end portion of the optical fibers 32 is bent so that the optical fibers 32 are substantially perpendicular to the main surface of the backplane 31, and an optical connector 33 is attached at the end portion.

Optical connectors 35 to be optically connected to the optical connectors 33 are provided at an end of a board 34. The optical connectors 35 and photoelectric conversion modules 36 on the board 34 are interconnected through an optical fiber array 37.

In this example, five boards can be attached to the backplane 31. Four optical connectors 35 are attached on the board 34 illustrated in FIG. 3, which are to be connected to four optical connectors 33 on the backplane 31. The optical fibers in each optical connector 33 on the backplane 31 are arranged in parallel to the plane of the board 34 and, likewise, the optical fibers at the end portion of the optical fiber array 37 are arranged in parallel to the plane of the board 34. In this example, the four optical connectors 35 on the board 34 illustrated and the four optical connectors 33 on the backplane 31 to be connected to the optical connectors 35 are arranged in the direction of the long sides of their front end faces.

Literature 2 does not describe in detail a structure for attaching the optical fibers 32 to the optical connectors 33, for example. Furthermore, the depicted structure that connects board 34 to the backplane 31 uses four optical connectors 33, 35 for each boards.

In order to reduce the number of parts, save optical connectors installation space, and increase the packing density, an MT ferrule could be attached to the terminal ends of a multi-fiber cable and a (large) number of MT ferrules could be set in one connector housing to unify optical connectors into one.

Such a configuration needs only one optical connector to be attached to a backboard for connecting one daughterboard. In this case, a plurality of MT ferrules are preferably arranged in the direction of the long side of the front end faces of the MT ferrules. That is, MT ferrules are preferably arranged in the direction in which the optical fibers are arranged in the front end faces of the MT ferrules. This arrangement is the same as the arrangement of the four optical connectors 33 corresponding to the optical connectors 35 on the board 34 in FIG. 3. The reasons why the arrangement is preferable lie in easiness of installation of multi-fiber cables on the backboard and accessibility to the terminal ends of the multi-fiber cables in consideration of board space saving.

In order to enable an MT ferrule to be easily attach to a connector housing, it is desirable that a mechanism, such as hooks 26 depicted in FIGS. 1 and 2, that latches and holds the MT ferrule be provided. The pair of hooks 26 in FIGS. 1 and 2 holds the long side of a rear end flange 15 of the MT ferrule 11. MT ferrules are typically mated and unmated by grasping the flange with fingers. With the structure in which the pair of hooks 26 holds the long side of the flange as described above, the MT ferrule is mated and unmated by grasping the short side of the flange.

Therefore, if a plurality of MT ferrules are arranged in the direction of the long side of the front end faces of the MT ferrules (the direction of the long side of the flange), the MT ferrules need to be spaced a sufficient distance apart from one another so that an adjacent MT ferrule does not obstruct grasping the short side of the flange. This increases the size of the connector housing that houses the plurality of MT ferules, preventing size reduction of optical connectors.

SUMMARY OF THE INVENTION

An object of the present invention is to provide an optical connector that is configured to receive a plurality of MT ferrules arranged in the direction of the long side of their front end faces and enables easy setting-in of MT ferrules, and to enable reduction in size of optical connectors.

According to the present invention, an optical connector configured to receive a plurality of MT ferrules attached to terminal ends of multi-fiber cables includes a housing through which a plurality of receiving holes receiving the MT ferrules are bored. The receiving holes are arranged in a direction of a long side of front end faces of the MT ferrules. A pair of holding elements is provided in each of the receiving holes. The pair of holding elements is positioned at both ends in the direction in which the receiving holes are arranged and protrudes to a side at which the MT ferrules are inserted. Both ends of a rear end flange of each of the MT ferrules placed in the receiving holes are held by the pair of holding elements.

According to the present invention, an optical connector having a structure in which a plurality of MT ferrules are arranged and set in the direction of the long side of their front end faces and held by holding elements enables an MT ferrule to be easily set in because the optical connector allows the long side of the flange of the MT ferrule to be grasped with fingers during the setting-in.

Furthermore, an adjacent ferrule does not obstruct setting-in of an MT ferrule even if MT ferrules are closely spaced to one another. This enables size reduction of optical connectors.

DETAILED DESCRIPTION OF THE EMBODIMENTS

Embodiments of the present invention will be described below.

Figure 1:
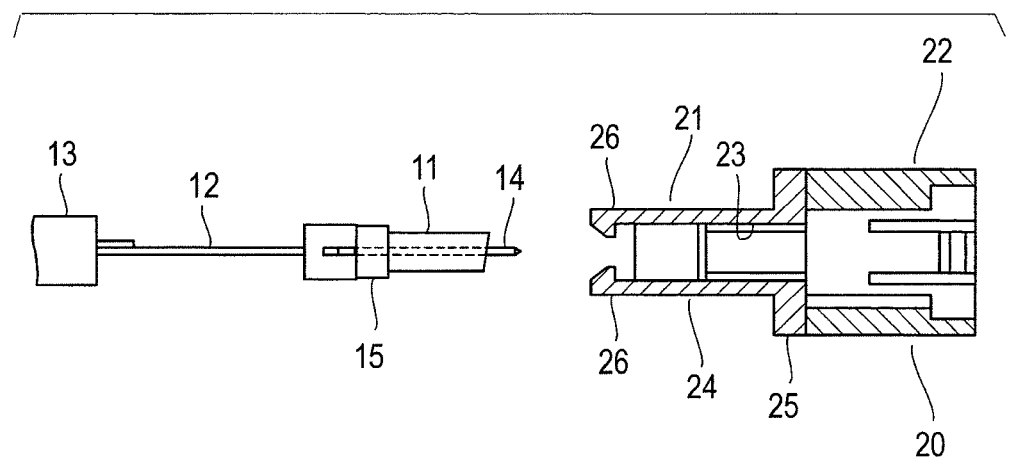
FIG. 1 is a diagram illustrating a conventional holding structure of an MT ferrule.
Figure 2:
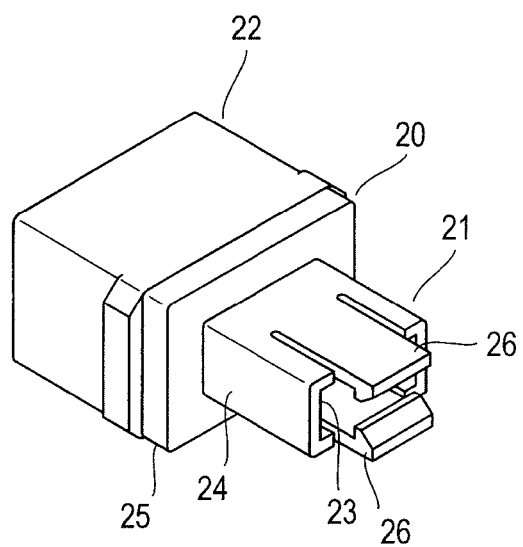
FIG. 2 is a perspective view of an optical receptacle housing in FIG. 1.
Figure 3:
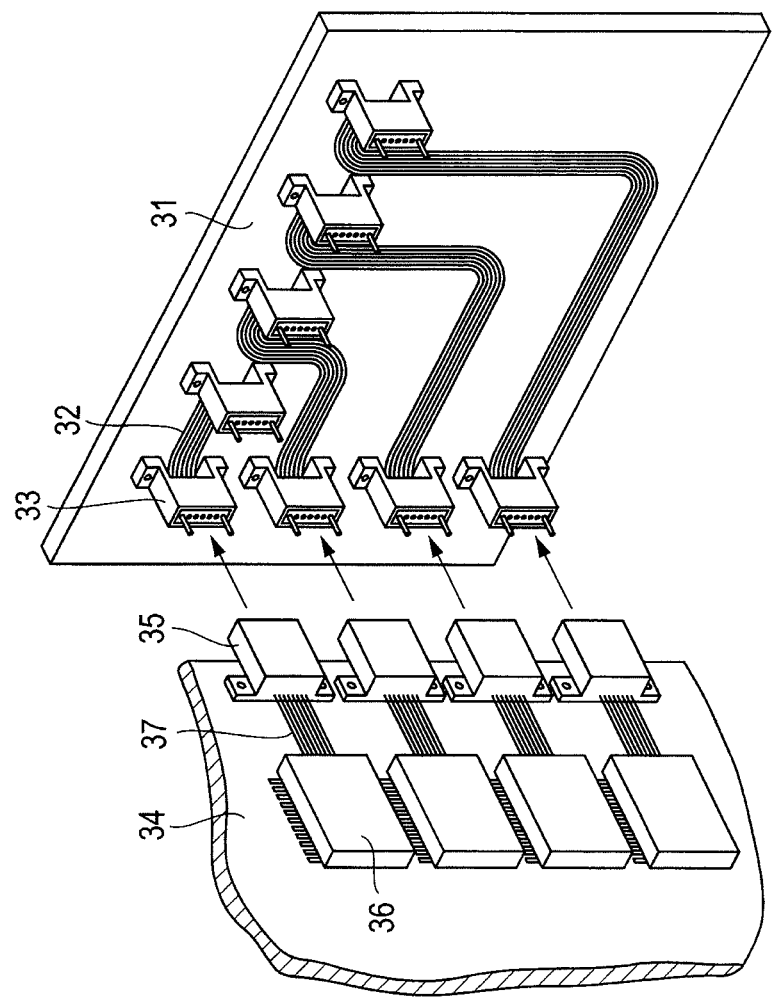
FIG. 3 is a perspective view illustrating a conventional structure for interconnecting an optical fiber backplane and a board.
Figure 4:
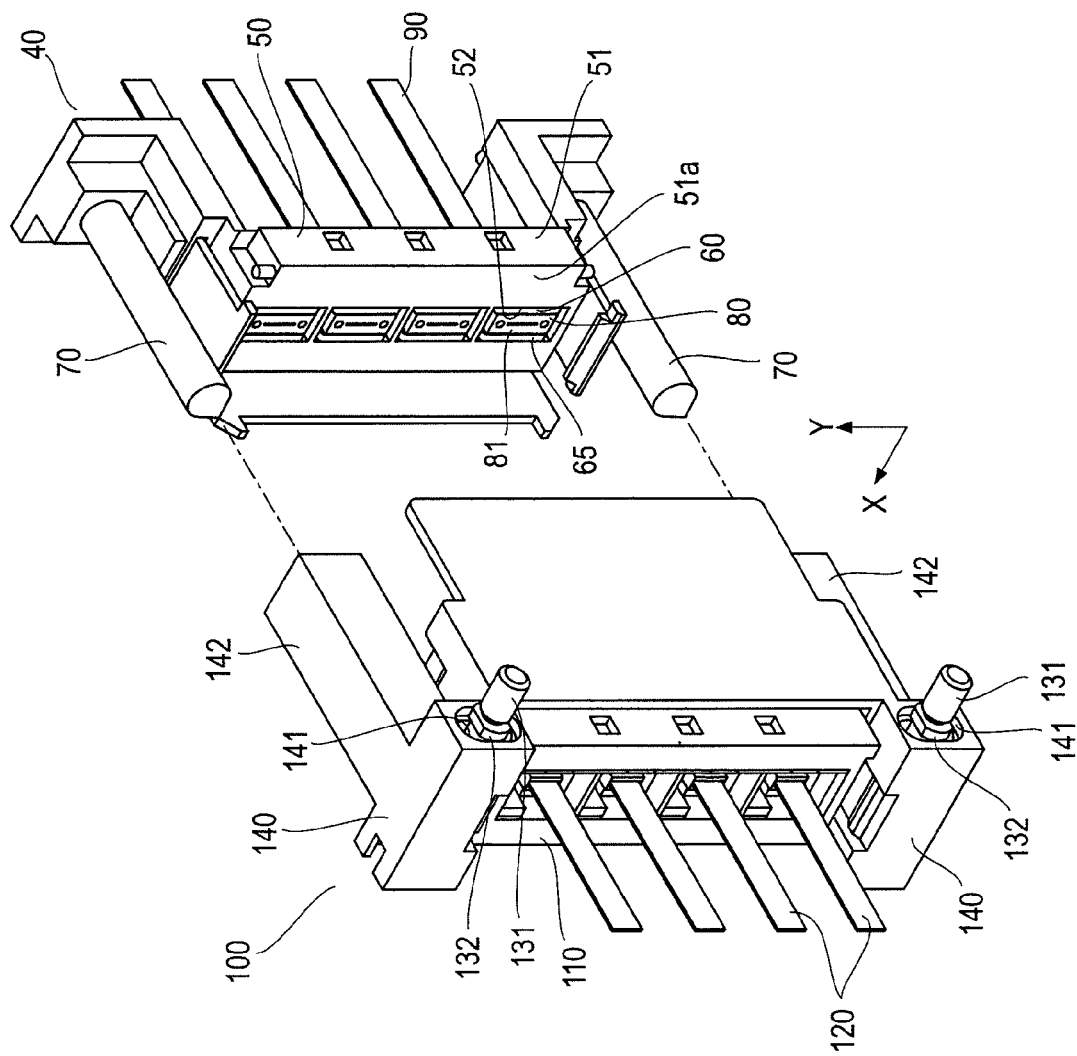
FIG. 4 is a perspective view of an embodiment of an optical connector according to the present invention depicted together with a mating optical connector.
Figure 5:
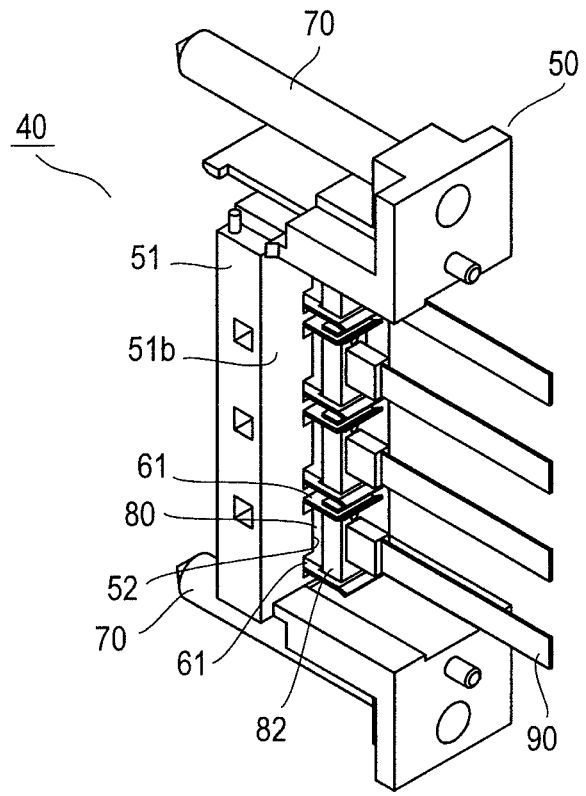
FIG. 5 is a perspective view of the embodiment of the optical connector according to the present invention illustrated in FIG. 4, viewed from the rear.
Figure 6:
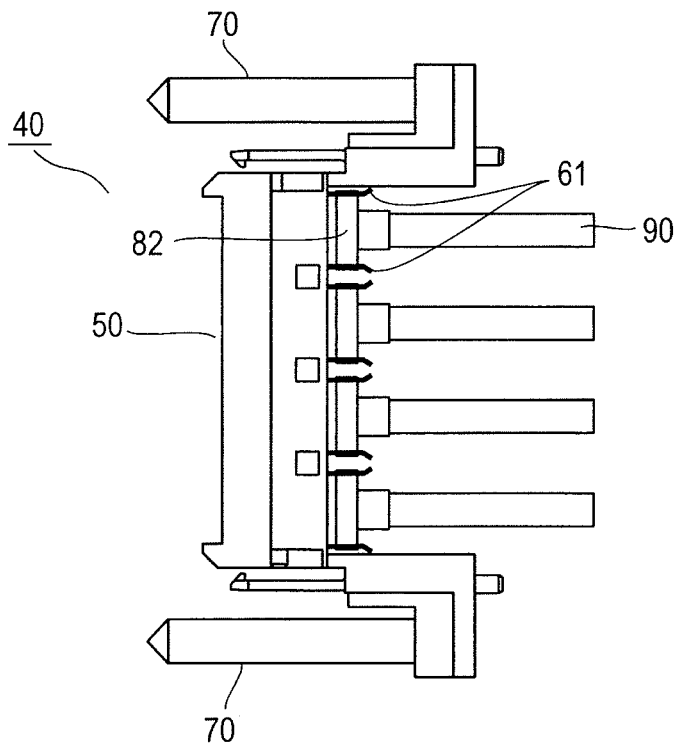
FIG. 6 is a side view of the optical connector illustrated in FIG. 5.
Figure 7:
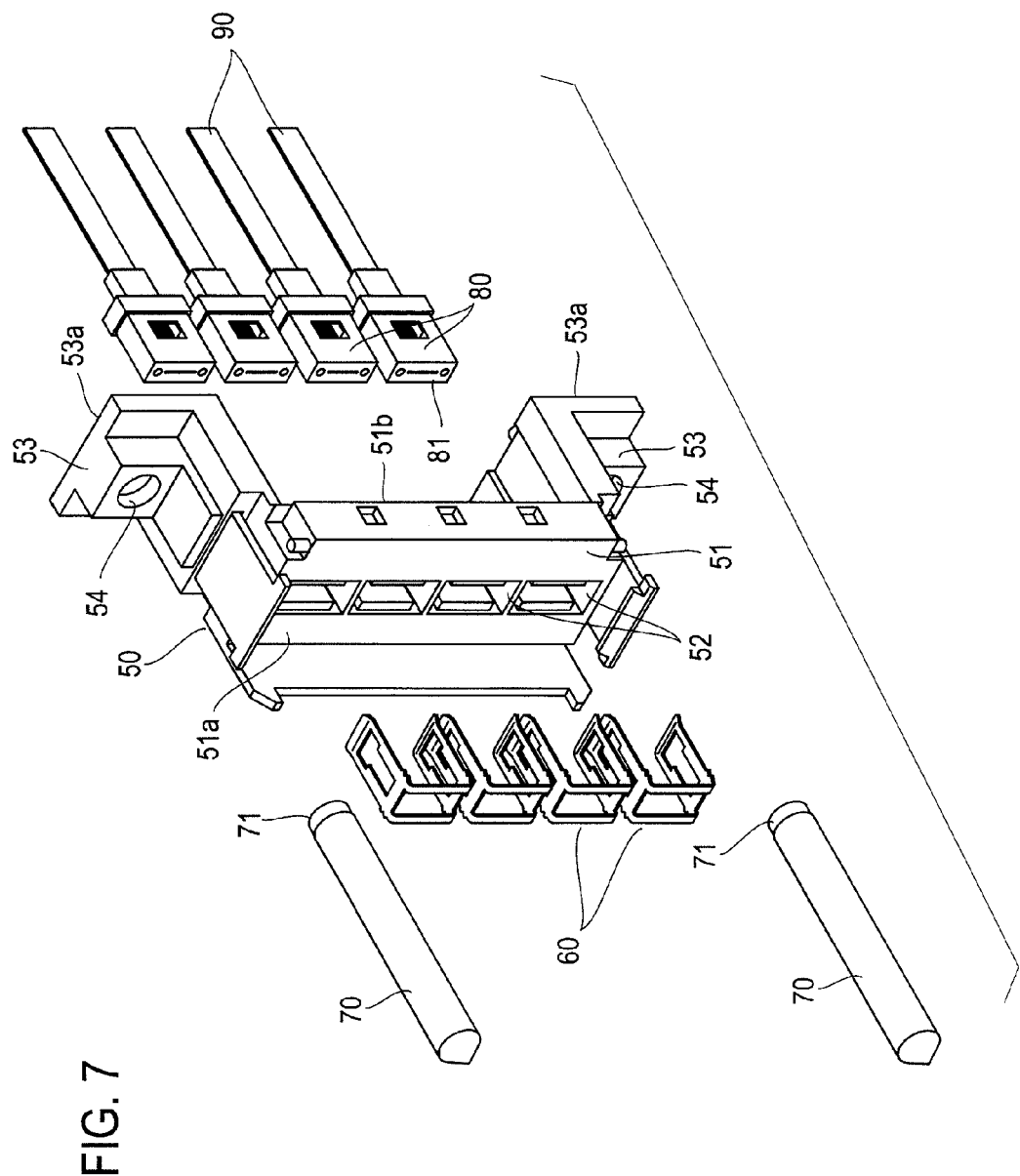
FIG. 7 is an exploded perspective view of the optical connector illustrated in FIG. 5.

FIGS. 4 to 6 illustrate an embodiment of an optical connector according to the present invention and FIG. 7 is an exploded view illustrating separated parts of the optical connector. Note that FIG. 4 also depicts a mating optical connector to be connected to the optical connector.

An optical connector 40 according to the present invention is intended to be installed on a backboard on which optical fibers are installed, for example. A mating optical connector 100 illustrated in FIG. 4 is intended to be attached on a daughterboard. The daughterboard can be connected to the backboard by interconnecting the optical connectors 40 and the mating optical connector 100.

As illustrated in FIG. 7, the optical connector 40 in this example includes a housing 50 made of a resin, four plate springs 60 bent into an angular U-shape, two guide pins 70, and four MT ferrules 80. Each of the four MT ferrules 80 is attached to a terminal end of a multi-fiber cable (optical fiber ribbon) 90. The multi-fiber cables 90 are led from the backboard.

Four receiving holes 52 receiving MT ferrules 80 are bored through a main part 51 of the housing 50. The four receiving holes 52 are arranged in the direction of a long side of a front end faces 81 of the MT ferrules 80 to receive. A fixing part 53 is provided at each end of the main part 51 in the direction in which the receiving holes 52 are arranged so that the fixing part 53 projects from the rear side of the main part 51.

The housing 50 is configured to be attached to the backboard so that the direction in which the receiving holes 52 are bored is perpendicular to the plate surface of the backboard. A bottom surface (projecting end face) 53a of each fixing part 53 is a surface to be fixed to the backboard. A hole 54 for attaching a guide pin 70 is formed in each of the pair of fixing parts 53. The guide pins 70 are press-fitted into and attached in the holes 54. Note that a reduced-diameter part 71 having a slightly reduced diameter is provided in the base end of each guide pin 70 in order to facilitate insertion of the guide pin 70 into the hole 54.

Figure 8:
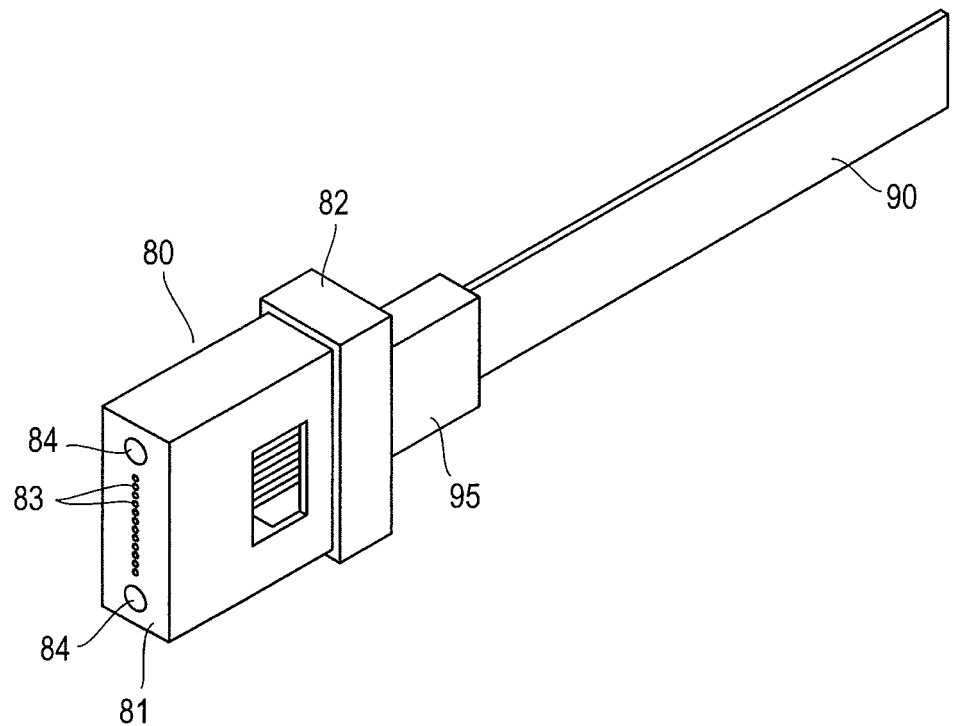
FIG. 8 is a perspective view of an MT ferrule attached to a multi-fiber cable in the optical connector illustrated in FIG. 5.

As illustrated in an enlarged view in FIG. 8, the MT ferrule 80 has the shape of a rectangular solid and a flange 82 is provided near the rear end. A number of fiber holes 83, twelve in this example, are formed in the front end face 81 of the MT ferrule 80. Two alignment holes 84 are formed at each side of the fiber holes 83. The fiber holes 83 and the alignment holes 84 are arranged along the long side of the front end face 81. An optical fiber of a multi-fiber cable 90 is inserted and fixed in each of the fiber holes 83. A boot 95 is also depicted in FIG. 8.

Figure 9:
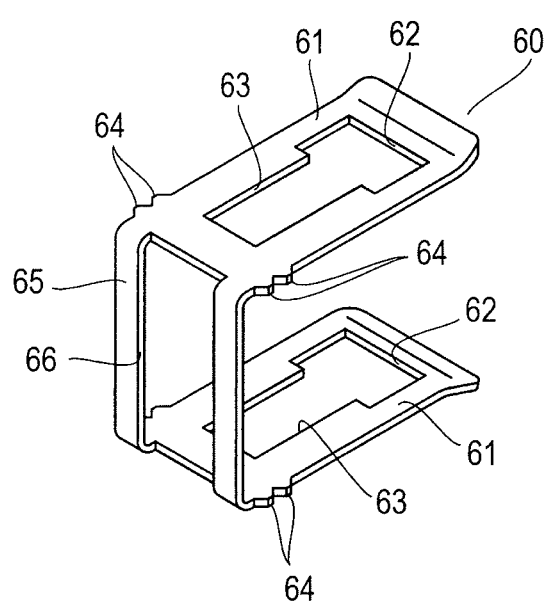
FIG. 9 is a perspective view of a holding element in the optical connector illustrated in FIG. 5.

The plate spring 60 bent into an angular U-shape has a shape as illustrated in an enlarged view in FIG. 9. Both legs of the angular U-shape serve as holding elements 61 holding the MT ferrule 80. A rectangular engage window 62 is formed at the free-end side of each of the pair of holding elements 61. An opening 63 which is narrower than the engage window 62 and continuous from the engage window 62 is formed so as to extend toward the base end of the holding element 61.

The free ends of the pair of holding elements 61 are bent outward to widen the distance between the free ends as illustrated in FIG. 9. Latch tabs 64 protruding outward in the width direction are formed at the base ends of the pair of holding elements 61. Note that a large rectangular window 66 in which the front end face 81 of the MT ferrule 80 is to be located is formed in an intermediate part 65 of the angular U-shaped plate spring 60.

The plate spring 60 having the shape described above is press-fitted into and attached in each of the four receiving holes 52 of the housing 50. The plate spring 60 is pressed in by inserting the plate spring 60 from the front face 51a side of the main part 51 of the housing 50 into the receiving hole 52. The plate spring 60 is latched in the housing 50 by latch tabs 64, so that the plate spring 60 cannot be extracted.

The intermediate part 65 of the plate spring 60 is substantially flush with the front face 51a of the main part 51 and the free ends of the pair of holding elements 61 protrude from the rear face 51b of the main part 51.

Figure 10:
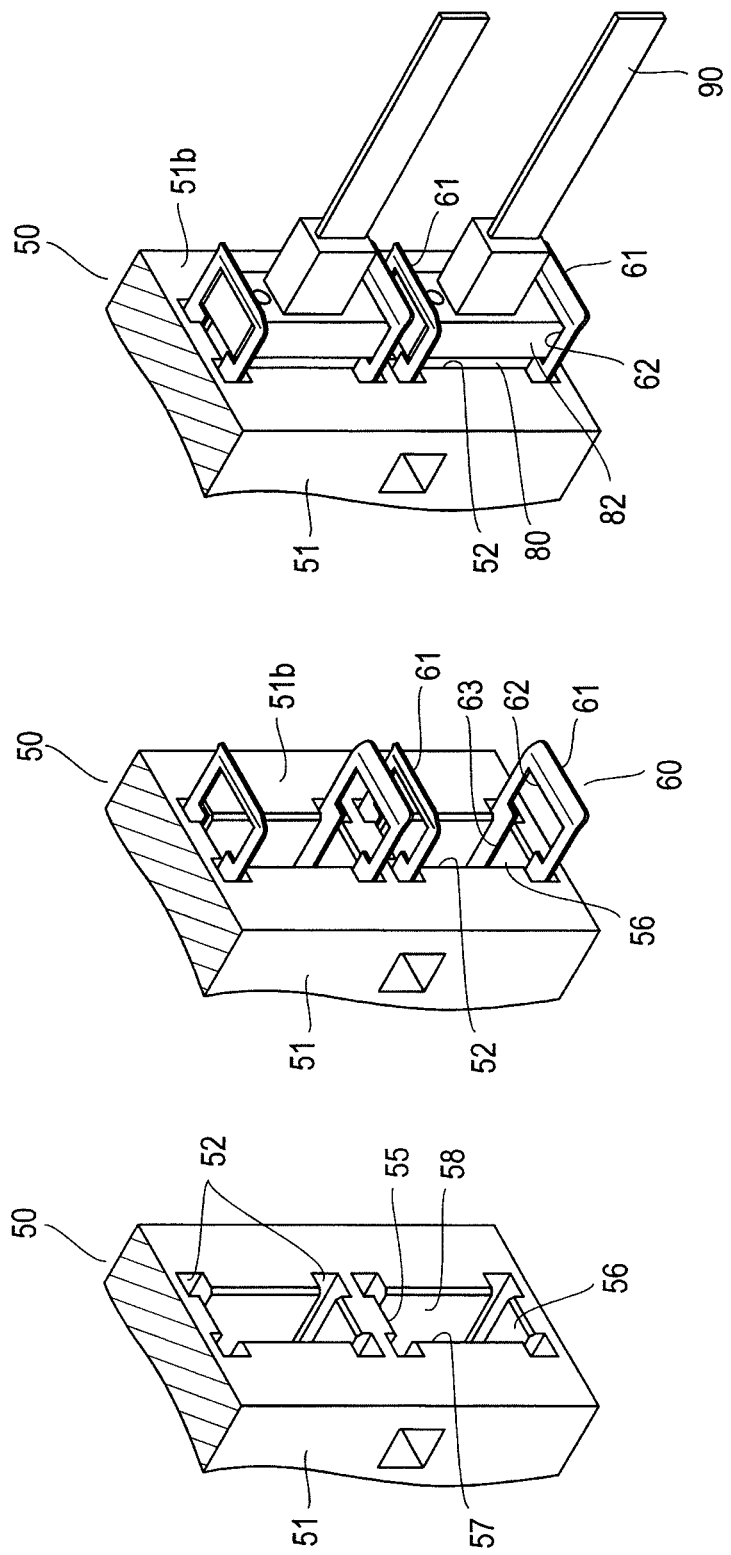
FIG. 10A is a perspective view illustrating receiving holes in the optical connector illustrated in FIG. 5.
FIG. 10B is a perspective view illustrating plate springs attached in the receiving holes illustrated in FIG. 10A.
FIG. 10C is a perspective view illustrating MT ferrules placed in the receiving holes illustrated in FIG. 10B.

FIG. 10B illustrates the plate springs 60 placed in the receiving holes 52 as described above, viewed from the rear face 51b side of the main part 51 of the housing 50. FIG. 10A illustrates the state before the plate springs 60 are placed.

As illustrated in FIG. 10B, the pair of holding elements 61 of the plate spring 60 are positioned at both sides in the direction in which the receiving holes 52 are arranged and the engage windows 62 formed in the holding elements 61 are positioned outside the housing 50. Raised parts 55 to 58 are formed on the upper and lower surfaces and left and right side surfaces inside each receiving hole 52 so that the raised parts 55 to 58 extend in the direction in which the receiving hole 52 is bored, as illustrated in FIG. 10A in this example. The raised parts 55 and 56 formed on the upper and lower surfaces are positioned in the openings 63 of the holding elements 61 and protrude from the inner surface of each of the pair of holding elements 61.

The MT ferrule 80 is set in by inserting the MT ferrule 80 from the rear face 51b of the main part 51 of the housing 50 into the receiving hole 52. The pair of holding elements 61 are somewhat spread out by the flange 82 of the MT ferrule 80, then return to their initial positions and each engage window 62 engages with the short side of each end of the flange 82 as illustrated in FIG. 10C. That is, the MT ferrule 80 is latched and removably held by the pair of holding elements 61.

As has been described above, the short sides at both ends of the flange 82 of the MT ferrule 80 in this example are held by the pair of holding elements 61. Accordingly, when the MT ferrule 80 is set in the housing 50, the long sides of the flange 82 can be grasped with fingers, which facilitates the setting-in.

Since the MT ferrule 80 can be set in the housing 50 by grasping the long sides of the flange 82 with fingers, an MT ferrule 80 adjacent to the MT ferrule 80 in the direction of the long side of the flange 82 does not obstruct the setting-in. Accordingly, the MT ferrules 80 can be closely spaced to one another, which enables size reduction of the optical connector 40.

Note that the front end face 81 of the MT ferrule 80 placed in the receiving hole 52 is substantially flush with the front face 51a of the main part 51 and the intermediate part 65 of the plate spring 60 as illustrated in FIG. 4. Movement of the MT ferrule 80 in the direction parallel to the front end face 81 is restricted to a predetermined distance by the raised parts 55 to 58 formed on the inner surfaces of the receiving hole 52.

The mating optical connector 100 to be connected with the optical connector 40 thus configured has a configuration illustrated in FIG. 4 and four MT ferrules (not visible in FIG. 4) are set in a housing 110 as in the optical connector 40. Multi-fiber cables 120, each having an MT ferrule attached at a terminal end thereof, are also illustrated in FIG. 4.

In this example, a floating mechanism allows the housing 110 which houses the MT ferrules to move in two directions, X and Y, parallel to the front end face 81 of the MT ferrules 80 of the optical connector 40. The floating mechanism includes two shafts 131 attached to the upper and lower ends of the housing 110, flanges 132 provided at both ends of each of the shafts 131 (the flanges at the back are not visible), and a pair of supporting parts 140 supporting the housing 110 through the shafts 131. Each of the shafts 131 is supported by being passed through a hole 141 provided in the supporting part 140. The hole 141 has an oval cross-section that is longer in the Y direction.

The mechanism described above allows each shaft 131 to move in the X and Y directions with respect to the supporting part 140 so that the housing 110 can move in the X and Y directions accordingly. This ensures that the MT ferrules inside the housing 110 are properly and securely connected with the MT ferrules 80 of the optical connector 40. Note that a guide part 142 having a guide hole (not visible in FIG. 4) is protruded from each of the pair of supporting parts 140. A pair of guide pins 70 of the optical connector 40 are inserted in the guide holes of the guide parts 142 to align the optical connector 40 with the pair of supporting parts 140.

An alternative embodiment of an optical connector according to the present invention illustrated in FIG. 11 will be described below. Like FIG. 4, FIG. 11 also illustrates a mating optical connector to be connected with the optical connector. Parts corresponding to the parts in FIG. 4 are given the same reference numerals.

In this example, receiving holes 52 are closely arranged in two rows in the direction of the long side of the front end faces 81 of MT ferrules 80 in a main part 51 of a housing 50 of the optical connector 40'. Eight MT ferrules 80 are set in the receiving holes 52 in the same way as in the optical connector 40 described above.

Each of the MT ferrules 80 is set in the housing 50 by grasping the longer sides of the flange 82 with fingers. In this example, two MT ferrules 80 adjacent to each other in the X direction can be easily set in by grasping the MT ferrules 80 with fingers at the same time. While not visible in FIG. 11, eight MT ferrules that are to be connected with the eight MT ferrules 80 of the optical connector 40' are set in a mating optical connector 100'.

Figure 11:
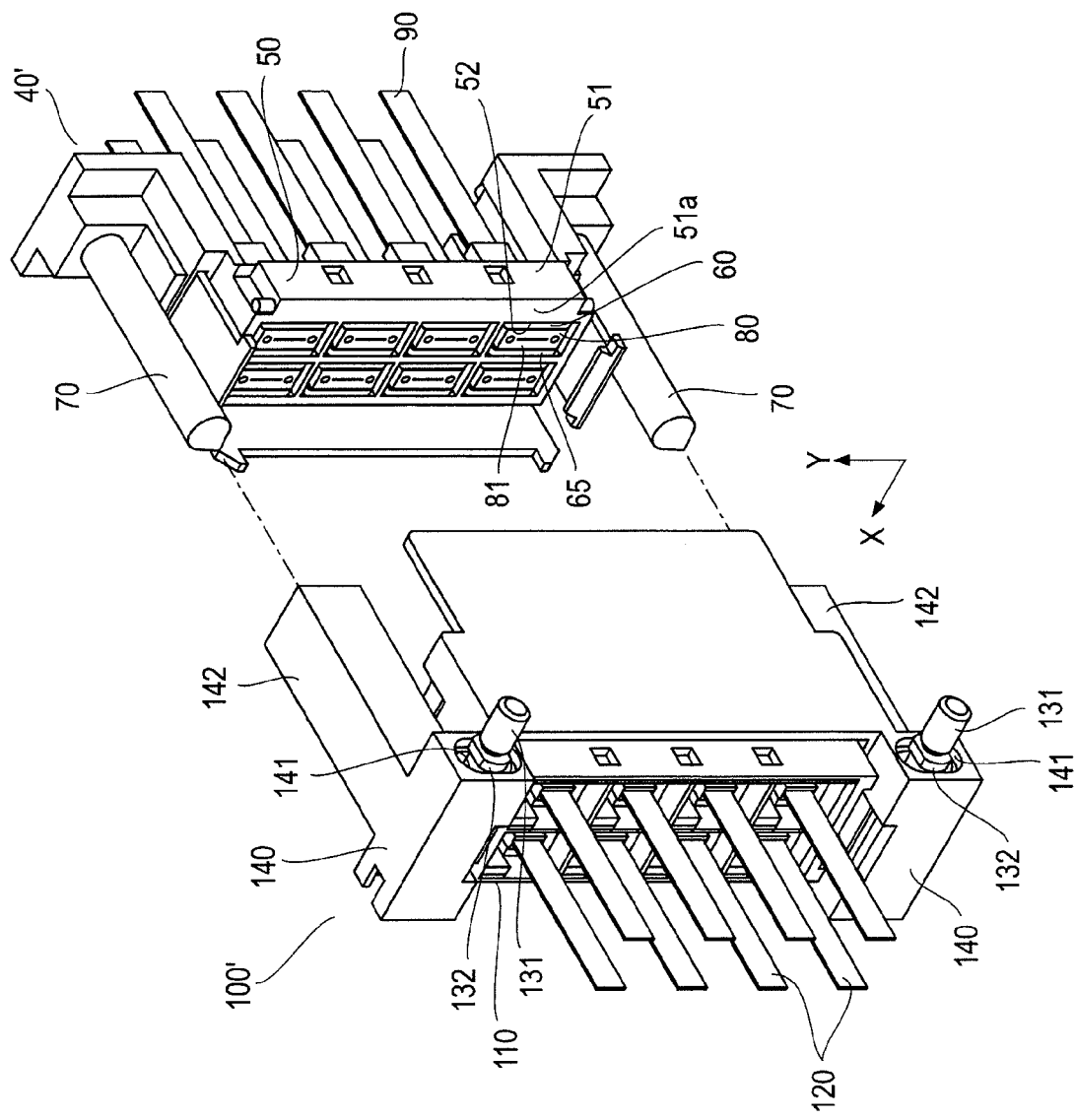
FIG. 11 is a perspective view of an alternative embodiment of an optical connector according to the present invention depicted together with a mating optical connector.
Figure 12:
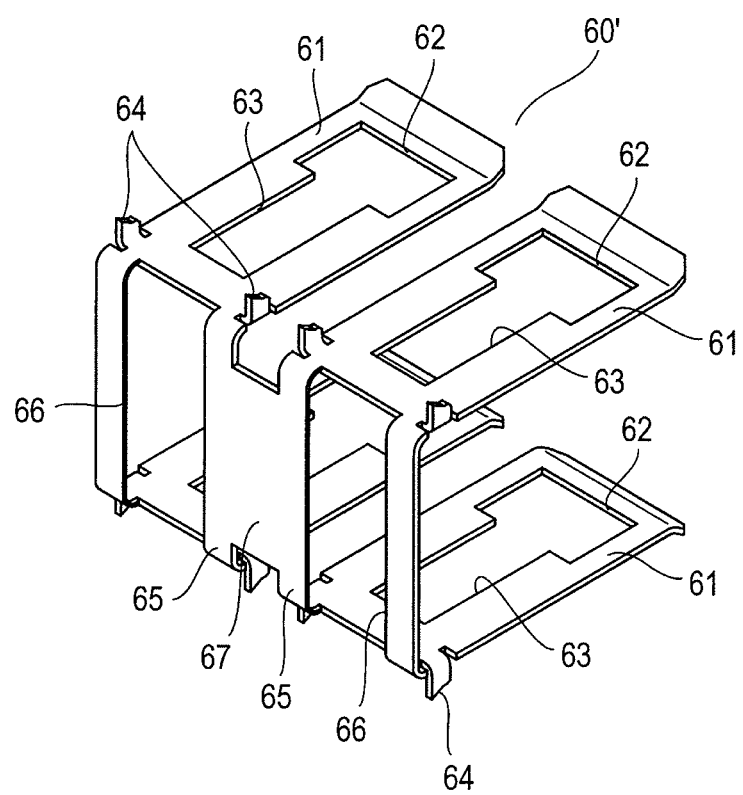
FIG. 12 is a perspective view illustrating a shape of plate spring that can be used in the alternative embodiment of the optical connector according to the present invention illustrated in FIG. 11.

FIG. 12 illustrates a shape of a plate spring preferably used in the optical connector 40' illustrated in FIG. 11. The plate spring 60' in this example is a twin plate spring and has a shape of a combination of two plate springs 60 illustrated in FIG. 9 joined by a joining part 67. The use of the twin plate spring 60' can reduce the number of parts and the number of assembly man-hours. Note that latch tabs 64 in FIG. 12 are bent up so as to vertically protrude.

While embodiments of optical connectors according to the present invention have been described as being mounted on a backboard on which optical fibers are provided, optical connectors according to the present invention are not limited to optical connectors intended to be mounted on a backboard but can be used in other applications.

What is claimed is:

1. An optical connector configured to receive a plurality of MT ferrules attached to terminal ends of multi-fiber cables,
    the optical connector comprising a housing through which a plurality of receiving holes receiving the MT ferrules are bored, the receiving holes being arranged in a direction of a long side of front end faces of the MT ferrules;
    wherein a pair of holding elements are provided in each of the receiving holes;
    the pair of holding elements are positioned at both ends in the direction in which the receiving holes are arranged and protrude to a side at which the MT ferrules are inserted; and
    both ends of a rear end flange of each of the MT ferrules placed in the receiving holes are held by the pair of holding elements.

2. The optical connector according to claim 1, wherein the pair of holding elements include engage windows each engaging with each of the both ends of the flange.

3. The optical connector according to claim 1, wherein the housing includes two or more closely arranged rows of the receiving holes.

4. The optical connector according to claim 2, wherein the housing includes two or more closely arranged rows of the receiving holes.

5. The optical connector according to any one of claims 1 to 4,
    wherein the pair of holding elements are formed by both legs of an angular U-shape of a plate spring bent into the angular U-shape; and
    an intermediate part of the angular U-shape of the plate spring includes a window in which one of the MT ferrules is located.

6. The optical connector according to claim 3,
wherein the pair of holding elements are formed by both legs of an angular U-shape of a plate spring bent into the angular U-shape;
an intermediate part of the angular U-shape of the plate spring includes a window in which one of the MT ferrules is located; and
adjacent ones of the plate springs in the two or more rows are joined by a joining part into one.

7. The optical connector according to claim 4,
wherein the pair of holding elements are formed by both legs of an angular U-shape of a plate spring bent into the angular U-shape;
an intermediate part of the angular U-shape of the plate spring includes a window in which one of the MT ferrules is located; and
adjacent ones of the plate springs in the two or more rows are joined by a joining part into one.

8. The optical connector according to claim 5, wherein the plate spring includes a latch tab to be press-fitted into the receiving hole and latched in the receiving hole.

9. The optical connector according to claim 6, wherein the plate spring includes a latch tab to be press-fitted into the receiving hole and latched in the receiving hole.

10. The optical connector according to claim 7, wherein the plate spring includes a latch tab to be press-fitted into the receiving hole and latched in the receiving hole.

11. The optical connector according to claim 5, wherein the receiving hole includes a raised part in an inner surface of the receiving hole, the raised part restricting movement of the MT ferrule in a direction parallel to the front end face of the MT ferrule.

12. The optical connector according to claim 6, wherein the receiving hole includes a raised part in an inner surface of the receiving hole, the raised part restricting movement of the MT ferrule in a direction parallel to the front end face of the MT ferrule.

13. The optical connector according to claim 7, wherein the receiving hole includes a raised part in an inner surface of the receiving hole, the raised part restricting movement of the MT ferrule in a direction parallel to the front end face of the MT ferrule.

14. The optical connector according to claim 8, wherein the receiving hole includes a raised part in an inner surface of the receiving hole, the raised part restricting movement of the MT ferrule in a direction parallel to the front end face of the MT ferrule.

15. The optical connector according to claim 9, wherein the receiving hole includes a raised part in an inner surface of the receiving hole, the raised part restricting movement of the MT ferrule in a direction parallel to the front end face of the MT ferrule.

16. The optical connector according to claim 10, wherein the receiving hole includes a raised part in an inner surface of the receiving hole, the raised part restricting movement of the MT ferrule in a direction parallel to the front end face of the MT ferrule.

17. The optical connector according to claim 1,
wherein the multi-fiber cables are lead from a backboard on which optical fibers are installed; and
the housing is attached to the backboard so that a direction in which the receiving holes are bored is vertical to a plane surface of the backboard.

18. The optical connector according to claim 2,
wherein the multi-fiber cables are lead from a backboard on which optical fibers are installed; and
the housing is attached to the backboard so that a direction in which the receiving holes are bored is vertical to a plane surface of the backboard.

19. The optical connector according to claim 3,
wherein the multi-fiber cables are lead from a backboard on which optical fibers are installed; and
the housing is attached to the backboard so that a direction in which the receiving holes are bored is vertical to a plane surface of the backboard.

20. The optical connector according to claim 4,
wherein the multi-fiber cables are lead from a backboard on which optical fibers are installed; and
the housing is attached to the backboard so that a direction in which the receiving holes are bored is vertical to a plane surface of the backboard.

21. The optical connector according to claim 5,
wherein the multi-fiber cables are lead from a backboard on which optical fibers are installed; and
the housing is attached to the backboard so that a direction in which the receiving holes are bored is vertical to a plane surface of the backboard.

22. The optical connector according to claim 6,
wherein the multi-fiber cables are lead from a backboard on which optical fibers are installed; and
the housing is attached to the backboard so that a direction in which the receiving holes are bored is vertical to a plane surface of the backboard.

23. The optical connector according to claim 7,
wherein the multi-fiber cables are lead from a backboard on which optical fibers are installed; and
the housing is attached to the backboard so that a direction in which the receiving holes are bored is vertical to a plane surface of the backboard.

* * * * *